United States Patent [19]

Manfrin

[11] Patent Number: 5,101,765
[45] Date of Patent: Apr. 7, 1992

[54] FEEDING DEVICE FOR ANIMAL FOODSTUFFS PERMITTING ADJUSTMENT OF THE FEED LEVEL

[75] Inventor: Adriano Manfrin, Sandrigo, Italy
[73] Assignee: SKA S.P.A., Sandrigo, Italy
[21] Appl. No.: 683,634
[22] Filed: Apr. 11, 1991

[30] Foreign Application Priority Data

Apr. 11, 1990 [IT] Italy .................. 84940 A/90

[51] Int. Cl.⁵ ............................................. A01K 5/02
[52] U.S. Cl. ..................................... 119/53; 119/74
[58] Field of Search ................ 119/53, 52.4, 57.4, 119/74, 54, 52.1

[56] References Cited

U.S. PATENT DOCUMENTS

| | | | |
|---|---|---|---|
| 984,980 | 2/1911 | Taylor | 119/53 |
| 2,505,396 | 4/1950 | Grindstaff | 119/52.4 |
| 3,388,690 | 6/1968 | Hostetler | 119/53 |
| 3,811,412 | 5/1974 | Murto et al. | 119/53 |
| 4,552,095 | 11/1985 | Segalla | 119/53 |
| 4,722,301 | 2/1988 | Strong | 119/57.4 |

FOREIGN PATENT DOCUMENTS

| | | | |
|---|---|---|---|
| 0745450 | 7/1980 | U.S.S.R. | 119/57.4 |
| 2080663 | 2/1982 | United Kingdom | 119/53 |

*Primary Examiner*—Robert P. Swiatek
*Assistant Examiner*—Todd E. Manahan
*Attorney, Agent, or Firm*—Browdy and Neimark

[57] ABSTRACT

The feeding device especially for chicken farming substantially comprises a cylindrical upright distributor (4) located above a containing plate (1) and connected at the upper part thereof to a feed-carrying horizontal tubular duct (5) supported by ropes (6). The distributor (4) is moved close to the plate (1) causing a reduction of the feed (7) level in the plate (1) by lowering the tubular duct (5). In addition, the distributor (4) has a pair of vertical recesses (8) and within each of them a C-shaped flat spring (9) is accommodated thereby forming a detent (10) into which a tooth (11) present on an annulus (3) integral to the plate (1) and disposed about the distributor (4) can be snap-fitted. In this way the feed level can be simultaneously reduced in all plates (1) of the distribution line by merely lowering the horizontal duct (5). Subsequently, as the chicken size grows, it is possible to simultaneously raise all plates (1) from ground by merely lifting the duct (5) since each distributor (4) has been made integral with the plate (1) due to the snap-fitting of the annulus tooth (11) in the C-shaped spring detent (10).

3 Claims, 3 Drawing Sheets

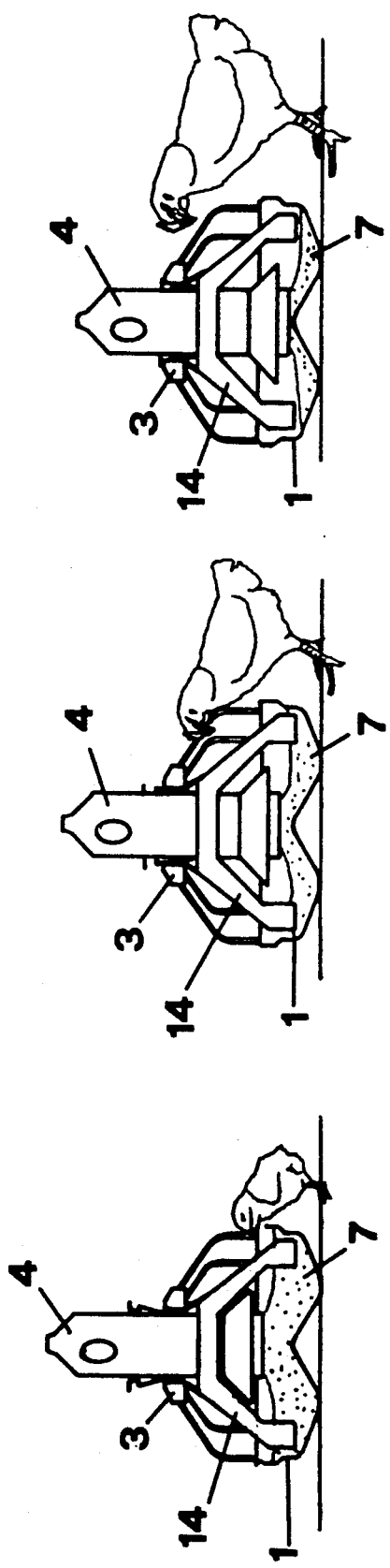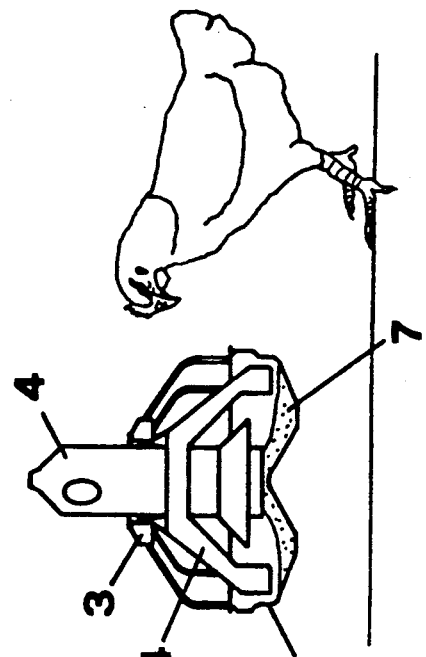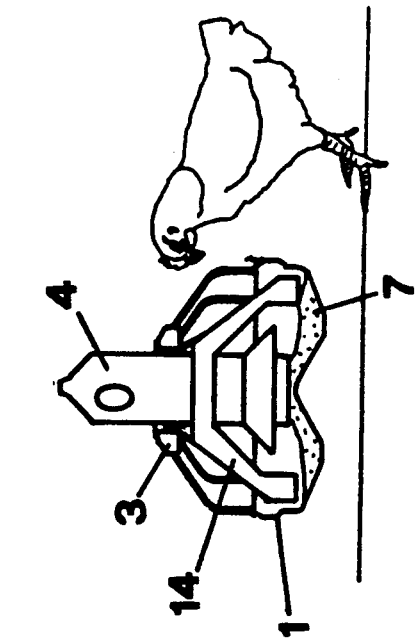

FEEDING DEVICE FOR ANIMAL FOODSTUFFS PERMITTING ADJUSTMENT OF THE FEED LEVEL

BACKGROUND OF THE INVENTION

1. Field of the Invention

The present invention relates to a feeding device for animal foodstuffs permitting adjustment of the feed level in feed-distribution lines for chicken farming in sheds.

2. Prior Art

It is known that the feeding devices in question substantially consist of a containing plate provided on the periphery thereof with a metal grating or cage fastened to an annulus disposed in coaxial relation externally to a cylindrical upright distributor. The upright distributor is located above the containing plate and feed coming from a horizontal tubular duct which is supported by ropes flows through the distributor into the plate. The distributor is connected to the horizontal tubular duct at the upper part thereof and is suspended therefrom.

It is known that the feed level in the containing plate (high level in case of chicks, low level in case of chickens) is determined by the relative vertical distance between the cylindrical distributor and the containing plate located under it. Practically the distributor is slidably moved by hand relative to the annulus external to it between two positions of maximum and minimum distance from the containing plate respectively, thereby giving rise to a variation of the feed level in the containing plate.

Presently, in accordance with the known art, the position adjustment of the cylindrical distributor is carried out by an operator who acts on each feeding device individually. He moves the cylindrical distributor downwardly as the animal size grows thereby decreasing the feed level in the plate and subsequently (when the chickens have reached a bigger size) raises the containing plate form ground. Therefore nowadays the operator intervenes on each feeding device individually in order to carry out said adjustments.

The operator's intervening represents a clear drawback due to the great waste of time, taking into account the fact that there is a great number of feeding devices in the various feed distribution lines in the sheds.

It is also to be noted that the operator, in order to avoid wasting time, tends to intervene on the feeding devices the lowest number of times. Practically there is therefore a passage from a completely raised position of the distributor to a completely lowered position without any intermediate adjustment. As is known, this brings about an important waste of feed by the animals, since the feed level is not accurately adjusted depending on the size reached by the animals.

Presently, still in accordance with the known art, the position adjustment of the distributor relative to the containing plate is carried out by the use of metal supporting hooks provided on the plate and engaged in holes arranged on the distributor outer surface at different heights.

In a second adjustment system provision is made for the use of notches disposed on the distributor and engaged by a pair of teeth resting thereon, which are provided on the annulus supporting the containing plate.

In both cases however the intervening of an operator is always required to act on each feeding device individually, which involves the above mentioned drawbacks.

SUMMARY OF THE INVENTION

Consequently it is an important object of the present invention to provide a feeding device permitting level adjustment to the animals size without needing direct and individual manual interventions on the feeding device itself.

A further object of the invention is to provide a feeding device allowing a reduced waste of feed by the animals.

The foregoing and further objects are all attained by the feeding device in accordance with the invention wherein said distributor is moved close to the containing plate by lowering the horizontal tubular duct and has a number of rectilinear recesses disposed vertically on its outer surface, within each of said recesses being accommodated a flat spring fastened to the lower base of the recess and having the upper free end thereof substantially folded according to a C-shaped configuration so as to form a housing within which one of the teeth located on the inner part of the annulus can be snap-fitted, when said distributor reaches said position of minimum distance from the containing plate by effect of the lowering of the horizontal tubular duct.

BRIEF DESCRIPTION OF THE DRAWINGS

Further features and advantages of the present invention will best be understood from the following detailed description of a preferred embodiment of a feeding device given hereinafter by way of non-limiting example with reference to the accompanying drawings, in which:

FIGS. 4a to 4e show the different adjustments of the feeding device according to the various animals' sizes.

Figure 1:
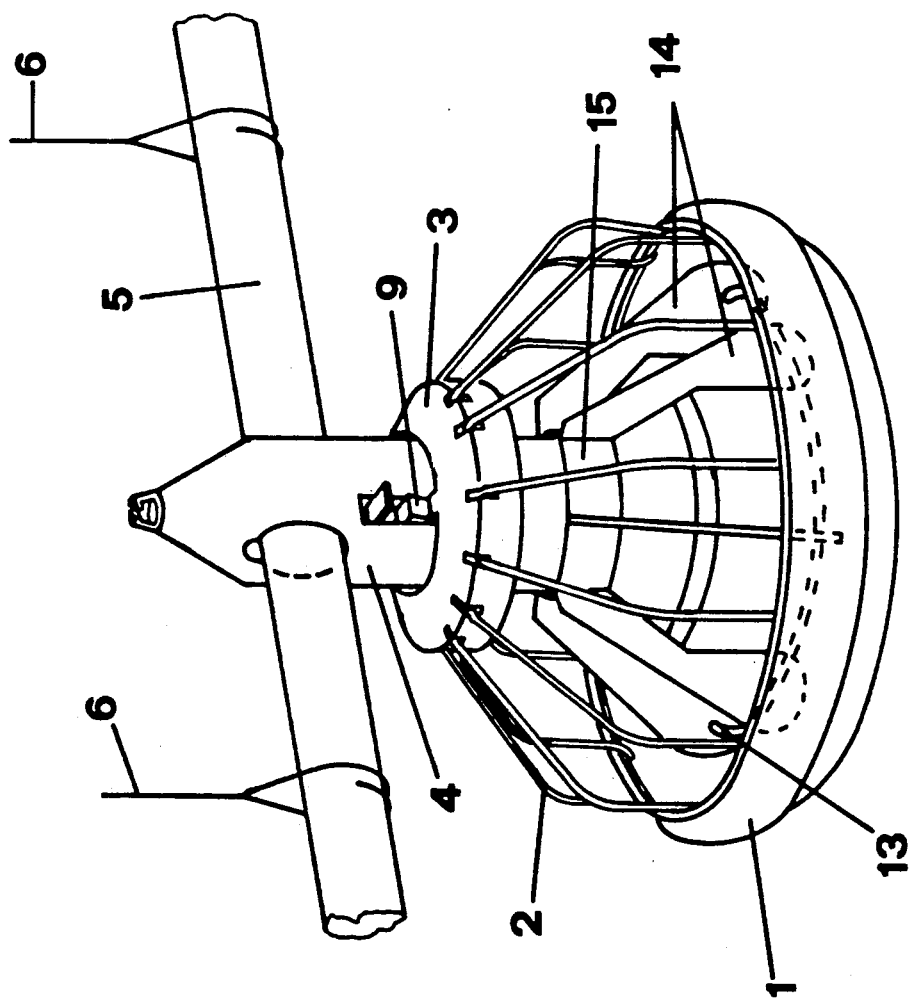
FIG. 1 is a perspective view of the feeding device of the invention.

Referring to the drawings, 1 denotes a containing plate provided on its periphery with a metal grating or cage 2 that is fastened, at the upper part thereof, to an annulus 3. Annulus 3 is disposed in coaxial relation to the outside of a hollow cylindrical upright distributor 4, which is capable of vertically sliding within the annulus 3 between two positions of maximum and minimum distance from the plate 1, respectively.

The distributor 4 is connected at the upper part thereof to a feed-carrying horizontal tubular duct 5 which is supported by ropes 6 mounted on a manually operated winch (not shown).

Referring to FIGS. 4a to 4e, reference numeral 7 denotes feed, the level of which is determined by the distance of the bottom outlet of the distributor 4 from plate 1. In fact, feed carried within the duct 5 by a screw feeder (not shown) enters the distributor 4 and is discharged into the plate 1.

Since the distributor 4 is supported by the duct 5, in order to move the distributor 4 closer to the plate 1 it is sufficient for the operator to activate the winch and cause the lowering of the duct 5 by the desired amount. In this manner by a single operation is it possible to carry out the desired adjustment of the distributor height relative to the plate 1, in all feeding devices of the same feed distribution line.

As already said, the highest position of the distributor 4 corresponds to the maximum feed level in plate 1. This situation, shown in FIG. 4a, is adapted for chick feeding.

After some days during which animals have grown in size, the situation will be that shown in FIG. 4b to which an intermediate position of the distributor 4 will correspond. The animals size will go on growing and the situation will then be that shown in FIG. 4c, corresponding to the maximum approaching of the distributor 4 to the plate 1, that is the maximum lowering of duct 5 and consequently the minimum level of feed in plate 1.

In the three cases shown in FIGS. 4a, 4b and 4c the containing plate 1 always rests on ground.

Provided on the outer surface of the distributor 4 is a pair of vertical rectilinear recesses 8 located at diametrically opposite positions. Housed in each of them is a flat spring 9 fastened to the lower base of the recess 8 and having the upper free end substantially folded according to a C-shaped configuration so as to form a detent 10 within which one of the teeth 11 disposed on the inner part of annulus 3 can be snap-fitted when the distributor 4, due to the lowering of the duct 5, reaches its position of minimum distance from plate 1. This situation is shown in FIGS. 3 and 4c.

It is to be noted that each tooth 11 slides on the spring 9 when the distributor 4 is moved downwardly towards the plate 1, as far as it si fitted in the detent 10.

Figure 2:
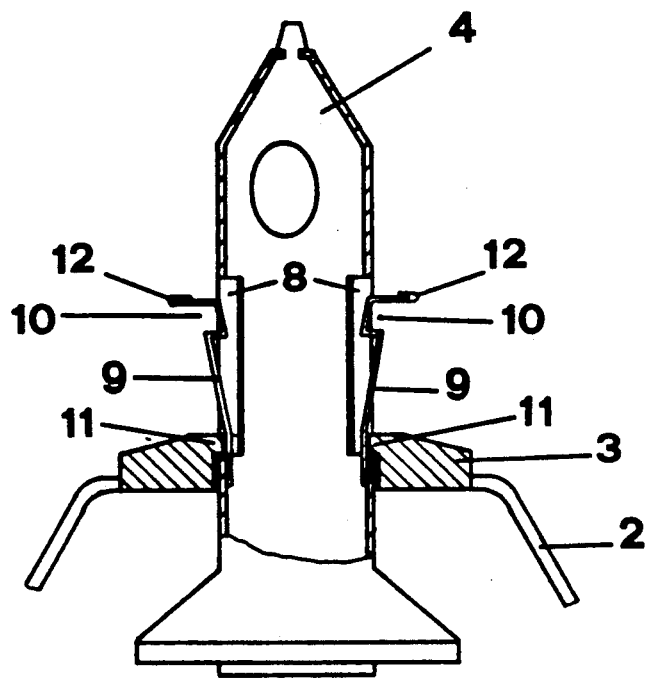
FIG. 2 is a cross-sectional vertical view of the cylindrical distributor in its highest position (maximum distance from the containing plate)
Figure 3:
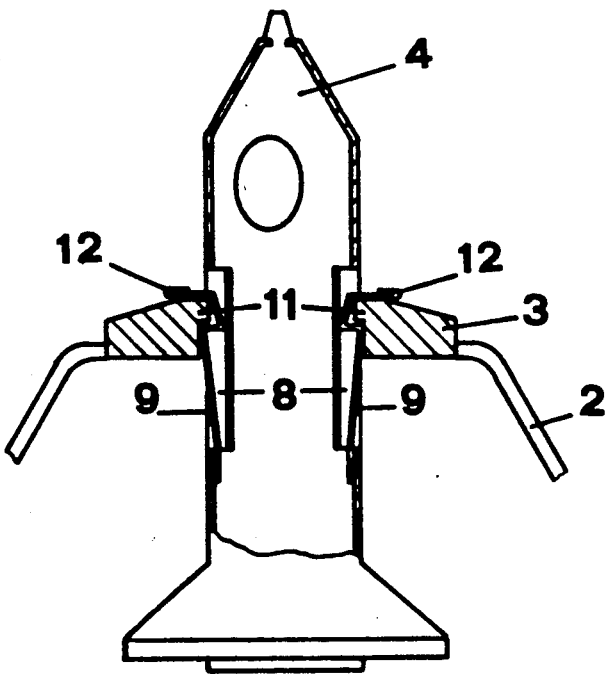
FIG. 3 is a vertical cross-sectional view of the cylindrical distributor in its lowest position (minimum distance from the containing plate)

The C-shaped configuration of detent 10, as viewed from FIGS. 2 and 3, comprises a folded back piece 12 at the upper part thereof, which enables the distributor 4 to be disengaged from the annulus 3 by exerting a manual pressure in a centripetal direction relative to the distributor itself. It is to be noted however that this intervention is necessary only at the end of the animals feeding period, when the starting positions are to be restored (chicks' feeding).

After some days, by virtue of the stable coupling between the distributor 4 and annulus 3 (which is integral to the plate 1), it is possible by a single intervention on the winch to raise the duct 5 so as to cause the lifting of the plate 1 to the desired height. This situation is shown in FIG 4d.

After some more days, when chicken have reached the maximum expected size before they are sent to slaughtering, by intervening on the winch the duct 5 will be raised still more and the whole feeding device line together with it. This situation is shown in FIG. 4e.

It will be recognized that all the steps shown in FIGS. 4a to 4e take plate without any direct intervention on the individual feeding devices.

In order to reduce the waste of feed by the animals to the minimum, the following expedients have been adopted.

A ring 13 which is raised relative to the plate 1 bottom, is placed within the containing plate 1, in the area included between the peripheral edge of the plate 1 and its central part overlain by the distributor 4. This ring 13 has the function of facilitating the exit of the chicks that, passing through the metal cage 2, may have entered the plate 1. Actually this facilitation in coming out of the plate 1 helps in reducing the feed waste.

Practically the ring 13 acts as a rest for the chicks' claws. In addition it helps in preventing the bigger animals from moving feed 7 too much towards the plate rim. In fact chickens tend to eat the fresher feed under the distributor 4 moving the other feed away towards the plate 1 thereby causing its coming out.

The presence of the ring 13 enables these drawbacks to be overcome.

As shown in FIG. 1. fastened to the ring 13 are some blades 14 disposed radially in vertical planes joining the ring 13 to a collar 15 disposed in coaxial relation on the outside of the distributor 4. Blades 14 create an obstacle to the entry and stay of the animals in plate 1. In addition they allow the number of days during which chicks can enter the plate 1 to be restrained. Actually, in the absence of blades 14 animals could go on entering the plate 1 until they are fifteen days old. Due to the presence of blades 14, animals have been found to stop entering the plate 1 when they are about seven days old, which is a clear advantage from the point of view of the reduction of feed waste.

Obviously in its practical accomplishment modifications and variations may be made to the invention as above described without departing from the scope of the invention itself. In addition, all of the details can be replaced by technically equivalent elements and the shapes and sizes as well as the materials used may be of any nature and magnitude depending upon requirements.

What is claimed is:

1. A feeding device for animal foodstuffs permitting adjustment of the feed level, comprising a containing plate provided on the periphery thereof with a metal grating or cage fastened to an annulus disposed in coaxial relation externally to a cylindrical upright distributor vertically sliding within said annulus between two positions of maximum and minimum distance from the plate respectively, an upper part of said distributor connected to a feed-carrying horizontal tubular duct supported by ropes, said distributor causing discharge of feed into the containing plate, the feed level in the plate depending on the distance of the distributor from the plate, wherein said distributor is moved close to the containing plate by lowering said horizontal tubular duct, said distributor having a number of rectilinear recesses disposed vertically on an outer surface, a flat spring fastened to a lower base of each of said recesses, said spring having an upper free end thereof substantially folded according to a C-shaped configuration so as to form a detent, teeth located on an inner part of said annulus which are snap-fitted into said detent when aid distributor reaches said position of minimum distance from the containing plate by effect of the lowering of said horizontal tubular duct.

2. The feeding device as claimed in claim 1, wherein said containing plate has a ring spaced from a bottom of and within said plate, in an area between a peripheral edge and a central part of said plate overlain by said distributor.

3. The feeding device as claimed in claim 2, wherein blades are associated with said ring, said blades disposed radially in vertical planes joining said ring to a collar slidably and coaxially disposed on the outside of said distributor.

* * * * *